United States Patent
Brett et al.

(10) Patent No.: US 11,387,479 B2
(45) Date of Patent: Jul. 12, 2022

(54) FLOW BATTERIES WITH CURRENT COLLECTORS HAVING A DIELECTRIC COATING

(71) Applicants: UCL BUSINESS LTD, London (GB); IMPERIAL INNOVATIONS LIMITED, London (GB)

(72) Inventors: Daniel John Leslie Brett, Chalfont St. Peter (GB); Leon Brown, London (GB); Thomas James Mason, Crowborough (GB); Ishanka Dedigama, London (GB); Anthony Robert John Kucernak, Cambridge (GB)

(73) Assignees: UCL BUSINESS LTD, London (GB); IMPERIAL COLLEGE INNOVATIONS LIMITED, London (GB)

( * ) Notice: Subject to any disclaimer, the term of this patent is extended or adjusted under 35 U.S.C. 154(b) by 0 days.

(21) Appl. No.: 15/733,406

(22) PCT Filed: Jan. 25, 2019

(86) PCT No.: PCT/GB2019/050219
§ 371 (c)(1),
(2) Date: Jul. 22, 2020

(87) PCT Pub. No.: WO2019/145733
PCT Pub. Date: Aug. 1, 2019

(65) Prior Publication Data
US 2021/0098809 A1    Apr. 1, 2021

(30) Foreign Application Priority Data
Jan. 26, 2018    (GB) ...................... 1801328

(51) Int. Cl.
*H01M 8/18*    (2006.01)
*H01M 50/409*    (2021.01)
(Continued)

(52) U.S. Cl.
CPC ............. *H01M 8/188* (2013.01); *H01M 4/96* (2013.01); *H01M 8/0228* (2013.01);
(Continued)

(58) Field of Classification Search
CPC .. H01M 8/188; H01M 8/0228; H01M 8/0269; H01M 8/0278; H01M 4/96; H01M 50/409
See application file for complete search history.

(56) References Cited

U.S. PATENT DOCUMENTS

2012/0223681 A1* 9/2012 Stone ...................... H01M 4/20
320/137

FOREIGN PATENT DOCUMENTS

WO    2010/070267    6/2010
WO    2012/117035    9/2012
(Continued)

OTHER PUBLICATIONS

International Search Report and Written Opinion corresponding to PCT/GB2019/050219, dated May 7, 2019 (11 pages).

*Primary Examiner* — Karie O'Neill Apicella
(74) *Attorney, Agent, or Firm* — Myers Bigel, P.A.

(57) ABSTRACT

Herein is disclosed, a rechargeable flow battery, wherein the flow battery comprises: first and second electrodes, separated such that ions are allowed to flow between them, wherein a first reservoir comprising or for holding a first fluid electrolyte is fluidly connected to the first electrode, to allow circulation of the first fluid electrolyte from the first reservoir to the first electrode and from the first electrode to the first reservoir; and a first current collector comprising a
(Continued)

layer of electrically conductive material having opposing first and second sides, wherein the first electrode is disposed on the first side of the first current collector, such that electrons can flow from the electrode to the first current collector, and a first layer of dielectric material is disposed on the second side of the first current collector.

17 Claims, 9 Drawing Sheets

(51) Int. Cl.
*H01M 4/96* (2006.01)
*H01M 8/0228* (2016.01)
*H01M 8/0202* (2016.01)
*H01M 8/0276* (2016.01)

(52) U.S. Cl.
CPC ....... *H01M 8/0269* (2013.01); *H01M 8/0278* (2013.01); *H01M 50/409* (2021.01)

(56) References Cited

FOREIGN PATENT DOCUMENTS

| | | | | |
|---|---|---|---|---|
| WO | 2016/168087 | 10/2016 | | |
| WO | WO-2016168087 A1 * | 10/2016 | .......... | H01M 8/0228 |

* cited by examiner

FLOW BATTERIES WITH CURRENT COLLECTORS HAVING A DIELECTRIC COATING

RELATED APPLICATIONS

This application is a 35 U.S.C. § 371 national stage application of PCT Application No. PCT/GB2019/050219, filed on Jan. 25, 2019, which claims priority from United Kingdom Patent Application No. 1801328.4, filed on Jan. 26, 2018, the contents of each of which are incorporated herein by reference in their entireties. The above-referenced PCT International Application was published in the English language as International Publication No. WO 2019/145733A1 on Aug. 1, 2019.

BACKGROUND

Large scale energy storage plays an important role in being able spread the energy harnessed from renewable energy storage technologies. Redox flow batteries (RFBs) are a promising candidate for large scale storage of energy harnessed by renewable energy sources such as wind and solar and may also be utilized as standalone power systems and even within vehicular applications. RFBs have a particular advantage of being able to de-couple power from energy: the former is usually a characteristic of the cell(s) architecture (electrode area, operating voltage, etc) whereas the latter is dependent on the volume (and concentration) of electrolyte available. This characteristic enables RFBs to lend themselves to many said applications: due to their inherent design flexibility.

A single RFB cell is typically constructed of two electrodes, which may be carbon-based and/or in the form of felts, cloths, papers, separated by a membrane, which is dependent on the chemistry of the battery, and current collectors. A typical RFB stack will have a number of single cells assembled in a bipolar configuration with internal or external manifolding. A bipolar carbon electrode is often disposed between each cell, to allow current to flow from one cell to the next. The entire assembly is compressed and sealed with external bolted endplates.

Considerable research has been carried out in the field of RFBs. Much of the research is focused on different components within the RFB architecture, i.e. different chemistries of the electrolytes, RFB conditioning strategies, electrode structure and membranes. However, RFBs still have some disadvantages, such as expense to manufacture and the difficulty if one cell in a stack fails. It would also be desirable to be able to improve performance aspects of redox flow batteries, such as reducing mass transport losses than can be seen in some RFB configurations.

It is therefore desirable to provide an alternative to or an improvement upon RFBs of the prior art.

SUMMARY OF THE INVENTION

In a first aspect, there is provides a rechargeable flow battery, wherein the flow battery comprises:
  first and second electrodes, separated such that ions are allowed to flow between them, wherein a first reservoir comprising or for holding a first fluid electrolyte is fluidly connected to the first electrode, to allow circulation of the first fluid electrolyte from the first reservoir to the first electrode and from the first electrode to the first reservoir; and
  a first current collector comprising a layer of electrically conductive material having opposing first and second sides, wherein the first electrode is disposed on the first side of the first current collector, such that electrons can flow from the electrode to the first current collector, and a first layer of dielectric material is disposed on the second side of the first current collector.

In a second aspect, there is provided a component for a rechargeable flow battery, the component comprising
  a current collector comprising a layer of electrically conductive material having opposing first and second sides, wherein a first electrode is disposed on the first side of the current collector, such that electrons can flow from the electrode to the current collector, and a layer of dielectric material is disposed on the second side of the current collector,
  wherein first and second apertures are provided through the current collector and the layer of dielectric material to allow fluid to flow though the dielectric material and the current collector via the first aperture to the electrode, along or through the electrode, and then out through the current collector and dielectric material through the second electrode.

In a third aspect, there is provided a component for a rechargeable flow battery, the component comprising
  a current collector comprising a layer of electrically conductive material having opposing first and second sides, wherein a first electrode is disposed on the first side of the current collector, such that electrons can flow from the electrode to the current collector, and a layer of dielectric material is disposed on the second side of the current collector,
  wherein electrically conductive material is selected from titanium, molybdenum, brass and flexible, intercalated graphite
  the dielectric material comprises a PCB material.

In a fourth aspect, there is provided a use of a printed circuit board material in a redox flow battery. Also provided is a use of a printed circuit board (PCB) material as the primary fluid (either gas or liquid) manifolding of a rechargeable flow battery.

The present inventors have devised flow batteries that solve or mitigate a number of problems associated with some flow batteries of the prior art. In contrast to many flow batteries that have carbon bipolar electrodes on either side of the current collector, the flow batteries described herein have a dielectric material, such as a printed circuit board material, in place of the carbon electrode. Printed circuit board materials provide a strong yet flexible cell architecture to flow battery cells and can be manipulated readily to form apertures and channels in the material to allow fluid to flow through them. Such printed circuit board materials can also be used to produce redox flow batteries that avoid the need for compression with the traditional bolts, and can be considerably thinner (from electrode to electrode) while showing the same or improved performance as traditional redox flow batteries. As will be seen, embodiments of the redox flow batteries described herein can have improved performance in certain respects, e.g. in the avoidance of shunt currents and high fault tolerances. The stacks can also be designed such that each cell is removable easily, without having to remove bolts and disable the entire stack (as can be the case with systems where the cells are bolted together). The use of dielectric materials, such as printed circuit board materials, may be counter-intuitive in some respects, since they may be viewed as unsuitable for use with some of the corrosive fluids used in redox flow systems. However, where a corrosive fluid is used, the present inventors have devised a redox flow batteries that avoid or limit the tendency for degradation of the printed circuit board material. Dielectric materials, such as printed circuit board materials, may be used as other components in the redox flow battery, e.g. as spacers between a membrane, which may be selected from an ion selective membrane and a molecular sieve membrane, and the current collector. Again, they have been found to have suitable strength and other characteristics that enables the cells to be formed without the need for the traditional design involving bolts. As can be seen, the redox flow battery may be used for both liquid analytes and gaseous analytes.

BRIEF DESCRIPTION OF THE FIGURES

FIG. 1C could also represent a cross-sectional view of the embodiment of FIGS. 2A and 2B, in use, when taken through a cross-section parallel to the flow of fluid F in FIGS. 2A and 2B.

DETAILED DESCRIPTION

Optional and preferred features of the aspects will now be described. Any optional or preferred feature may be combined with any aspect or any other optional or preferred feature.

Dielectric Material

The RFB or component thereof may comprise a current collector comprising a layer of electrically conductive material having opposing first and second sides, wherein a first electrode is disposed on the first side of the current collector, such that electrons can flow from the electrode to the current collector, and a layer of dielectric material is disposed on the second side of the current collector.

The layer of dielectric material is preferably a polymeric layer. The dielectric material preferably has a dielectric constant of from 2 to 6, in some examples from 2 to 5. The dielectric constant may be measured at 500 MHz or 1 GHz. FR-4, for example, has a dielectric constant at about 4.35, measured at 500 MHz and 4.34, measured at 1 GHz.

The layer of dielectric material may be a printed circuit board material, which may be considered to be a non-electrically conductive substrate suitable for use, and optionally accepted for use, in a printed circuit board. Such materials have been found to have a suitable balance of properties for use in a redox flow battery as described herein, such as in terms of strength, dielectric properties and ease of manipulation. A printed circuit board material may be defined as a fibre-reinforced polymeric layer or a polymeric layer (which may lack fibre-reinforcement) having a metallic layer on one side thereof (in use, the side facing away from the current collector). Preferably the layer of dielectric material comprises a fibre-reinforced polymeric layer. The layer of dielectric material may be selected from FR-1, FR-2, FR-3, FR-4, FR-5, FR-6, CEM-1, CEM-2, CEM-3, CEM-4, CEM-5, polytetrafluoroethylene, G-10, woven fibreglass/PTFE laminates. In the field of printed circuit boards, standardised codes (e.g. FR-1 or CEM-3) for printed circuit boards are used for certain types of non-electrically conductive substrates. FR indicates 'fire-resistant', i.e. fire resistant to a certain temperature, as measured in a certain standard test (e.g. UL94), and the following numeric code indicates the nature of the material. CEM indicates composite epoxy material, and, again, the following numeric code indicates the nature of the material. Some definitions of these materials are given below.

FR-2 (Flame Resistant 2) may defined as a phenolic paper or phenolic cotton paper, paper impregnated with a phenol formaldehyde resin.

FR-4 (Flame Resistant 4) may be defined as a woven fiberglass cloth impregnated with an epoxy resin. It is typically rated to 130° C.

FR-3 (Flame Resistant 3) may be defined as cotton paper impregnated with epoxy resin. It is typically rated to 105° C.

FR-5 (Flame Resistant 5) may be defined as woven fiberglass and epoxy, and is typically specified to 170° C.

FR-6 (Flame Resistant 6) may be defined as matte glass fibres and impregnated with a polyester resin.

CEM-1 may be defined as cotton paper impregnated with epoxy resin.

CEM-2 may be defined as cotton paper impregnated with epoxy resin.

CEM-3 may be defined as non-woven glass impregnated with epoxy resin.

CEM-4 may be defined as a woven glass impregnated with epoxy resin.

CEM-5 may be defined as a woven glass impregnated with polyester resin.

G-10 may be defined as a woven glass impregnated with an epoxy resin. It is typically rated to 130° C. It has high insulation resistance, low moisture absorption, very high bond strength.

G-11 may be defined as a woven glass impregnated with an epoxy resin. It is typically rated to 170° C. It has high resistance to solvents, high flexural strength retention at high temperatures.

The layer of dielectric material may be at least 20 μm thick, optionally at least 30 μm thick, optionally 30 μm to 2 mm thick, preferably 50 µm to 1 mm thick, more preferably 0.1 mm-0.8 mm thick, most preferably about 0.4 mm thick.

Current Collector Comprising a Layer of Electrically Conductive Material

The layer of electrically conductive material may be a metallic layer or a layer of electrically conductive non-polymeric material, including, but not limited to, carbon and electrically conductive polymers. The metallic layer may comprise an elemental metal or an alloy.

The metallic layer may comprise copper. However, for some analytes, copper has been found to corrode too easily. In an embodiment, the surface of the electrically conductive material, which, in use, would be in contact with the electrode, may have been passivated, i.e. providing a more-corrosion resistant coating over the copper, yet still providing reasonable electrical conductivity. Optionally, the surface of the electrically conductive material may have been coated with an ink or paint comprising electrically conductive particles, e.g. particles selected from carbon (e.g. graphite) particles, electrically conductive titanium suboxide (e.g. $Ti_4O_7$), $Ti_{0.9}Nb_{0.1}O_2$, doped tin oxide (doped with antimony, fluorine, or indium to improve conductivity), or an ink composed of electrically conductive polymer particles. Examples of suitable polymers include polyaniline, polypyrrole, polythiophene and poly(3,4-ethylenedioxythiophene) (PEDOT). Optionally, an electrically conducting polymer has been electrodeposited onto the surface of the electrically conductive material, which, in use, is in contact with the electrode, and such an electrically conducting polymer may be selected from polyaniline, polypyrrole, polythiophene and poly(3,4-ethylenedioxythiophene) (PEDOT). Optionally, an organic group is attached to the surface of the electrically conductive material, which, in use, is in contact with the electrode. The organic group may be formed by the reaction of a silyl-chloride with a hydrophobic backbone, a silyl alkoxide with a hydrophobic backbone, or a perfluorinated alkoxy silane, with the surface.

While copper is highly conductive, even when passivated, it may not be suitable for long-term use in a RFB, since the fluids can be very corrosive.

Optionally, the layer of electrically conductive material is selected from titanium, molybdenum, brass and carbon. The carbon comprises a flexible, intercalated graphite, e.g. commercially available as Grafoil. These particular materials have been found to provide suitable electrical conductivity, can adhere well to the dielectric layer and have high resistance to corrosion, so they are particularly suitable to use in RFBs with corrosive analytes.

In an embodiment, the surface of the electrically conductive material, which, in use, would face the electrode, may have a coating selected from titanium nitride, carbon, copper, molybdenum or brass. These coatings may be applied by screen printing using a suitable ink, physical vapour deposition or chemical vapour deposition.

The layer of electrically conductive material may be may be at least 20 µm thick, optionally at least 30 µm thick, optionally 30 µm to 2 mm thick, preferably 50 µm to 1.5 mm thick, more preferably 0.4 mm-1 mm thick, more preferably 0.5 to 1 mm thick, most preferably about 0.75 mm thick.

In an embodiment, first and second apertures are provided through the first current collector and the layer of dielectric material disposed on the second side of the first current collector to allow fluid to flow though the dielectric material and the current collector via the first aperture to the first electrode, along or through the electrode, and then out through the current collector and dielectric material through the first electrode. The first and second apertures may be located in the first current collector and the layer of dielectric material such that they are adjacent to (e.g. underlie) the first electrode, to allow fluid to flow directly into or past the first electrode from the first aperture and out of or from the first electrode from the second aperture. In an embodiment a plurality of first apertures are provided and/or a plurality of second apertures are provided. The apertures may be of any shape. In an embodiment, the apertures are circular or have a regular shape, e.g. an n-sided shape, where n is at least 3, e.g. between 3 and 10. Optionally the apertures are elongate, when viewed from above a surface of the current collector or layer of dielectric material, e.g. rectangular. In use, the first current collector and layer of dielectric material may be orientated such that their planes are vertical and the apertures arranged such that the second aperture is lower than the first aperture, to allow fluid to flow downwards past or through the first electrode. The second aperture may be directly below the first aperture, to allow vertical flow of the fluid past or through the first electrode. In an alternative embodiment, the second aperture may be lower than the first aperture, but not directly below it, to allow flow at an incline between the first and second apertures.

Optionally, a protective member, e.g. a protective annular member, extends, around an edge of the dielectric material that defines the first and/or second aperture, to prevent contact of the first fluid electrolyte with the dielectric material. This has been found to be particularly effective in prolonging the life of the RFB containing a printed circuit board material as the dielectric layer when used with a corrosive fluid. PCB material can degrade on contact with many of the fluids used in redox flow batteries. The protective annular member may comprise a material that is resistant to corrosion from acidic substances. Preferably the protective annular material is a resilient material, e.g. a rubber material, which may be a synthetic or natural rubber. The protective annular member has been found to form an effective seal around the apertures in the dielectric material, when they are compressed between the dielectric material and a layer of material on either side of it. The protective member may comprise a material selected from butadiene rubber (BR), butyl rubber (IIR), chlorosulfonated polyethylene (CSM), epichlorohydrin rubber (ECH, ECO), ethylene propylene diene monomer (EPDM), ethylene propylene rubber (EPR), fluoroelastomer (FKM), nitrile rubber (NBR, HNBR or HSN), perfluoroelastomer (FFKM), polyacrylate rubber (ACM), polychloroprene (neoprene) (CR), polyisoprene (IR), polysulfide rubber (PSR), polytetrafluoroethylene (PTFE), sanifluor, silicone rubber (SiR), thermoplastic elastomer (TPE) styrene, a thermoplastic polyolefin (TPO) (e.g. selected from LDPE, HDPE, LLDPE, ULDPE), a thermoplastic polyurethane (TPU), a thermoplastic etheresterelastomers (TEEEs) copolyester, a thermoplastic polyamide (PEBA), a melt processible rubber (MPR), and a thermoplastic vulcanizate (TPV).

The protective member will preferably be shaped so that it follows the edge of the first or second aperture in the dielectric material. If the aperture is circular or rounded, a circular O-ring may be used. In an embodiment, the protective annular member is selected from an O-ring, an X-ring and a D-ring. An X-ring and a D-ring are similar to an O-ring, except that, whereas the O-ring has a circular cross-section, the X-ring and D-rings have cross-sections representing an 'X' shape or a 'D' shape. They can be used to form seals between the layers, to allow fluid-flow through the apertures in the dielectric layer, and into adjoining layers, without the fluid contacting the dielectric material.

In an embodiment, the layer of dielectric material is disposed on the second side of the current collector. The layer of dielectric material may be adhered to the current collector. The layer of dielectric material may be adhered to the current collector by an adhesive layer. The adhesive layer will comprise a suitable adhesive to form a bond between the material of the layer of dielectric material and the material of the current collector. The adhesive may comprise a cured, e.g. thermoset, polymer, such as an epoxy resin or polyimide polymer. In an embodiment, the adhesive layer comprises a cured pre-preg layer. A pre-preg layer is a fibrous layer pre-impregnated with a curable resin, such as a thermosetting resin, which, once cured forms a solid polymer that can adhere to the current collector and a dielectric material. The pre-preg layer may, for example, comprise a woven or non-woven fibrous layer impregnated with a curing, e.g. thermosetting, polymer, such as an epoxy polymer, a polyimide polymer or other suitable polymer. The fibres of the fibrous layer of the pre-preg may comprise fibreglass or another fabric reinforcement.

Spacer

In an embodiment, a spacer is located between the membrane and the current collector in the same plane as the electrode. The spacer may be located adjacent the electrode, and, in an embodiment, surround the electrode. In an embodiment, the spacer comprises a dielectric material that is disposed between the membrane (which may be selected from an ion selective membrane and a molecular sieve membrane) and the current collector, and, if the spacer comprises a layer of dielectric material, the spacer may be termed a second layer of dielectric material. The spacer, e.g. which may comprise a dielectric material, may be disposed between the membrane (which may be selected from an ion selective membrane and a molecular sieve membrane) and the current collector and surround the electrode. In an embodiment, the spacer comprises a layer, e.g. of dielectric material, having an aperture therein for accommodating the electrode. The dielectric material of the spacer may be a printed circuit board material, which may be the same as or different from, any printed circuit board material used in the layer of dielectric material on the second side of the current collector. The dielectric material of the spacer may be as defined above for the layer of dielectric material on the second side of the current collector. The dielectric material of the spacer may be selected from FR-1, FR-2, FR-3, FR-4, FR-5, FR-6, CEM-1, CEM-2, CEM-3, CEM-4, CEM-5, polytetrafluoroethylene, G-10, woven fibreglass/PTFE laminates.

In an embodiment, if the spacer comprises a layer of dielectric material having an aperture therein for accommodating the electrode, a protective annular member may extend around the edge of the dielectric material (defining the aperture) closest to the electrode, to prevent contact of the first fluid electrolyte with the dielectric material if the spacer; and the protective annular member for the spacer may be as defined above in the context of the first and second apertures, and may be formed from the same or different material as the protective annular member for the first and second apertures. The protective annular member for the aperture in the spacer may comprise a resilient material, e.g. a rubber material, which may be a synthetic or natural rubber, and/or may be in the form of an O-ring, an X-ring or a D-ring.

The spacer may be adhered, on one side, to the current collector and/or, optionally on the other side, if present, a membrane (which may be selected from an ion selective membrane and a molecular sieve membrane). The spacer may be adhered to the current collector and/or the membrane (which may be selected from an ion selective membrane and a molecular sieve membrane) by an adhesive layer. The adhesive layer will comprise a suitable adhesive to form a bond between the material of the spacer, which may be a dielectric material) and/or the material of the current collector or the material of the membrane (which may be selected from an ion selective membrane and a molecular sieve membrane). The adhesive may comprise a cured, e.g. thermoset, polymer, such as an epoxy resin or polyimide polymer. In an embodiment, the adhesive layer comprises a cured pre-preg layer. A pre-preg layer is a fibrous layer pre-impregnated with a curable resin, such as a thermosetting resin, which, once cured forms a solid polymer that can adhere to the current collector and a dielectric material. The pre-preg layer may, for example, comprise a woven or non-woven fibrous layer impregnated with a curing, e.g. thermosetting, polymer, such as an epoxy polymer, a polyimide polymer or other suitable polymer. The fibres of the fibrous layer of the pre-preg may comprise fibreglass or another fabric reinforcement.

First and Second Electrodes

The first and/or second electrode may each be a porous electrode, with pores therein to allow fluid to flow through the pores. Such an electrode may be termed a 3D electrode or a 'flow-through' electrode. Such electrodes are particularly suitable for fluids that are in liquid form. The first and/or second electrode may be in the form of a felt, a cloth, or a foam. Preferably, the electrode comprises carbon, and may be selected from a graphite felt electrode, graphene, a carbon felt electrode and a carbon foam electrodes.

The first and/or second electrode may be a planar electrode, which the first fluid can flow past. Such an electrode may be termed a 'flow-by' electrode. Such electrodes are particularly suitable for fluids that are in gaseous form or involve the formation of a gaseous reactant during use of the redox flow battery. The electrode may, for example, be in the form of paper, e.g. a carbon paper.

The first and second electrodes are separated to allow ions to flow between them. They may be separated by a membrane (which may be selected from an ion selective membrane and a molecular sieve membrane). The ion-selective membrane or a molecular sieve membrane may also be termed a polymer electrolyte membrane, an ion-conducting membrane or a proton exchange membrane (PEM). The membrane may comprise a material selected from a fluorinated, e.g. a perfluorinated hydrocarbon, or a non-fluorinated polymer having acidic side groups. The fluorinated, e.g. perfluorinated hydrocarbon, may be a fluorinated or perfluorinated polymer, which may have one or more pendant functional groups, which may be acidic functional groups, including, but not limited to carboxylate groups or sulfonate groups. In an embodiment, the membrane is a sulfonated tetrafluoroethylene polymer or co-polymer, including, but not limited to, a co-polymer of tetrafluoroethylene and a fluorinated (optionally perfluorinated) sulphonic acid-containing monomer, e.g. $CF_2=CF-O-R-SO_3H$, where R is a linker group, optionally a perfluorinated linker group that may contain ether linkages, such as $-OCF_2-C(CF_3)F-O-CF_2-CF_2-$. Perfluorinated polymer having sulfonate groups are available commercially, e.g. under the trade name, Nafion, available from Sigma Aldrich.

The membrane may comprise a non-fluorinated polymer, e.g. a polymer selected from polyphenylene, polystyrene, bi-phenyl sulfone, polyetherketones, polyethersulfones, which preferably has acidic side groups, e.g. sulfonic acid side groups.

The molecular sieve membrane may be selected on the basis of the ions that are to be selectively transmitted through the membrane. Accordingly, the molecular sieve may be selected to have suitable pore sizes for the selective transmissions of certain ions through the membrane. Molecular sieves include, but are not limited to, silica-alumina materials, e.g. zeolites, which may be natural or synthetic, silica gel, borosilicate glasses, crosslinked polysaccharides, such as dextran gels, which may be alkylated, agarose gels, cellulose gels, agar gels, crosslinked polyacrylamides and polyethylene oxides crosslinked via acrylate groups.

The first and second electrodes will typically be connected electrically to allow electrons to flow from one to the other via an external circuit (i.e. not through the membrane or, in a membrane-less RFB, via the laminar flow between the electrodes). The first and second electrodes may be connected electrically via the current collectors to which they are adjacent, each of the current collectors having an electrical connection extending laterally beyond the layer of dielectric material.

In alternative embodiment, the redox flow battery is a membrane-less redox-flow battery. In a membrane-less redox-flow battery, laminar flow may be employed between the first and second electrodes, for example where first and second fluids flow between first and second electrodes, which may be planar electrodes, in the same direction. Membrane-less redox flow batteries can be used, for example, in HBr redox flow batteries, e.g. where the first fluid comprises $Br_2$ and the second fluid comprises HBr, both of which flow between first and second electrodes during discharging of the RFB.

Second Electrode Arrangement

The flow battery may comprises a second reservoir comprising or for holding a second fluid electrolyte, the second reservoir being fluidly connected to the second electrode, to allow circulation of the second fluid electrolyte from the second reservoir to the second electrode and from the second electrode to the second reservoir. The flow battery may further comprise a second current collector comprising a layer of electrically conductive material having opposing first and second sides, wherein the second electrode is disposed on the first side of the second current collector, such that electrons can flow from the electrode to the second current collector, and a layer of dielectric material is disposed on the second side of the second current collector.

The layer of dielectric material disposed on the second side of the second current collector may be the same as or different from the layer of dielectric material on the second side of the first current collector. The dielectric material disposed on the second side of the second current collector may be a printed circuit board (PCB) material. The dielectric material disposed on the second side of the second current collector may be selected from FR-1, FR-2, FR-3, FR-4, FR-5, FR-6, CEM-1, CEM-2, CEM-3, CEM-4, CEM-5, polytetrafluoroethylene, G-10, G-11, alumina, polyimide, woven fibreglass/PTFE laminates.

The second current collector may be the same as or different from the first current collector, and may be as defined above for the first current collector.

In an embodiment, first and second apertures are provided through the second current collector and the layer of dielectric material disposed on the second side of the second current collector to allow fluid to flow though the dielectric material and the current collector via the first aperture to the second electrode, along or through the electrode, and then out through the current collector and dielectric material through the second electrode. The first and second apertures may be located in the second current collector and the layer of dielectric material such that they are adjacent to (e.g. underlie) the second electrode, to allow fluid to flow directly into or past the second electrode from the first aperture and out of or from the second electrode from the second aperture. In an embodiment a plurality of first apertures are provided and/or a plurality of second apertures are provided in the second current collector and the adjacent layer of dielectric material. The apertures may be of any shape. In an embodiment, the apertures are circular or have a regular shape, e.g. an n-sided shape, where n is at least 3, e.g. between 3 and 10. Optionally the apertures are elongate, when viewed from above a surface of the current collector or layer of dielectric material, e.g. rectangular. In use, the second current collector and layer of dielectric material may be orientated such that their planes are vertical and the apertures arranged such that the second aperture is lower than the first aperture, to allow fluid to flow downwards past or through the first electrode. The second aperture may be directly below the first aperture, to allow vertical flow of the fluid past or through the first electrode. In an alternative embodiment, the second aperture may be lower than the first aperture, but not directly below it, to allow flow at an incline between the first and second apertures.

Optionally, a protective member, e.g. a protective annular member, extends, around an edge of the dielectric material that defines the first and/or second aperture in the layer of dielectric material disposed on the second side of the second current collector, to prevent contact of the second fluid electrolyte with the dielectric material. The protective annular member for the apertures in the dielectric material on the second side of the second current collector may be as defined above for the protective annular member for the apertures in the dielectric material on the second side of the first current collector, e.g. a synthetic or natural rubber, and/or may be in the form of an O-ring, an X-ring or a D-ring.

Backing Plate

Optionally, a backing plate may be located on the first layer of dielectric material of an opposite side to the current collector associated with the first and/or second electrode. The backing plate may be any suitable material that can provide structural stability to the dielectric material, such as, metal, ceramic and/or plastic.

Chemistry of the Redox Flow Battery.

The flow battery described herein may be used with any couples. The couples will determine the content of the first and second fluids described herein, with one half of the couple being present in the first fluid and the other half of the couple being present in the second fluid. The first and/or second fluid may be a liquid. The first and/or second fluid may be a gas. In an embodiment the first fluid is a corrosive fluid, e.g. an acidic fluid, such as an aqueous acidic fluid or a gaseous fluid comprising species, such as HBr that are corrosive.

In an embodiment, the redox flow battery involves an all-vanadium couple, a hydrogen-vanadium couple, a hydrogen-lithium bromate couple, a hydrogen-lithium chlorate couple, a bromine-hydrogen couple, an iron-tin couple, an iron-chrome couple, a bromine-polysulfide couple, a zinc bromine couple, a lead-acid (methane sulfonate) couple, a zinc-cerium couple, a hydrogen-polyoxometalate couple, or a lead acid couple, or the redox flow battery is a lithium ion flow battery, an ionic-liquid flow battery, and a molten salt flow battery.

The all-vanadium couple may be a vanadium sulphate-based couple or a vanadium bromide-based couple (i.e. with sulphate or bromide providing counter-ions to the vanadium ions in the first and second fluids). In an all vanadium couple, one half of the couple contains V(II) and V(III) and the other half of the couple contains V(IV) and V(V).

In an embodiment, the first fluid is in the form of a liquid and the second fluid is in the form of a gas. For example, the vanadium-hydrogen couple may be used, e.g. with the first fluid being a liquid containing vanadium ions, and the second fluid containing a gas, namely hydrogen and oxygen. The reactions of the hydrogen-vanadium couples may be illustrated as follows:

$$\text{Anode:} H_2 \rightarrow 2H^+ + 2e^- \quad \text{Equation 1}$$

$$\text{Cathode:} \tfrac{1}{2}O_2 + 2H^+ + 2e^- \rightarrow H_2O \quad \text{Equation 2}$$

$$\text{Overall:} H_2 + \tfrac{1}{2}O_2 \rightarrow H_2O \quad \text{Equation 3}$$

$$\text{Anode:} H_2 + 2H_2O \rightarrow 2H_3O^+ + 2e^- \quad \text{Equation 4}$$

$$\text{Cathode:} VO_2^+ + 4H_3O^+ + 2e^- \rightarrow 2VO^{2+} + 6H_2O \quad \text{Equation 5}$$

$$\text{Overall:} 2VO_2^+ + 2H_2O + H_2 \rightarrow VO^{2+} + 4H_2O \quad \text{Equation 6}$$

In an embodiment, a first reservoir comprising or for holding a first fluid electrolyte is fluidly connected to the first electrode, to allow circulation of the first fluid electrolyte from the first reservoir to the first electrode and from the first electrode to the first reservoir. In a further embodiment, a second reservoir comprising or for holding a second fluid electrolyte is fluidly connected to the second electrode, to allow circulation of the second fluid electrolyte from the second reservoir to the second electrode and from the second electrode to the second reservoir. The first and/or second reservoir mentioned herein may be any suitable receptacle for storing the first and/or second fluid. The first and/or second reservoir may comprise a tank, for example, for holding a liquid, if the first and/or second fluid is a liquid. The first and/or second reservoir may comprise a gas cannister, for example, for holding a gas, if the first and/or second fluid is a gas. The first and/or second reservoirs may be fluidly connected to the first and/or second electrodes by conduits, such as pipes, for transporting the first and/or second fluids. The conduits, e.g. pipes connect with, e.g. insert into, the first and second apertures in the layer of dielectric material on the second side of the first or second current collector. Pumps may be provided to induce flow of the first and/or second fluids from the first and/or second reservoirs to the first and/or second electrodes. If the first and/or second fluids is/are gases, expanders and/or compressors may be provided in the circulation stream to/from the first and/or second reservoirs, e.g. either side of gas cannisters for compressing a gas.

In an embodiment, the flow battery comprises a regenerator fluidly connected to either the first and/or second electrodes, the regenerator acting to regenerate species that are either oxidised or reduced at the electrode. For example, the flow battery may comprise a regenerator, such that the first fluid electrolyte flowing to the first electrode reacts such that the species in the electrolyte are oxidised, and then the fluid flows to a regenerator in which the oxidised species are reduced to allow their circulation back to the first fluid electrode, at which they can be oxidised again. In an embodiment, the regenerator may involve exposing the first or second fluid electrolyte to hydrogen to reduce the species in the electrolyte. In an embodiment, the regenerator may involve exposing the first or second fluid electrolyte to oxygen or an oxidising agent to oxidise the species in the electrolyte. In the circuit from the first or second electrode to the first fluid reservoir or second fluid reservoir (as appropriate), the regenerator may be located between the first or second electrode and the first or second fluid reservoir or in the first or second fluid reservoir.

The flow battery may be such that both first and second fluid contain ions, which, during use of the cell are oxidised and/or reduced and remain in the fluid; such a flow battery may be considered a 'classical flow battery chemistry'. Alternatively, the flow battery may have a 'hybrid' flow battery chemistry in which, during use of the cell, e.g. during charging or discharging, one of the species in the first and/or second fluids precipitates onto the electrode.

In an embodiment, the redox flow battery comprises a plurality of cells, each cell comprising first and second electrodes as defined in any one of the preceding claims, e.g. with all other associated components as described herein, e.g. first and/or second current collector, membrane, and first and/or second reservoir. Optionally, the first charge collector of a cell in the stack is electrically connected to the second charge collector of a neighbouring cell in the stack. Optionally, one or more channels are present through the layers of each cell, but not through the electrodes, to allow the first fluid to flow through one cell (to be termed the first cell) to the first electrode of the other cell (to be termed the second cell), and optionally to return to the first cell, and/or to allow the second fluid to flow through one cell (to be termed the second cell) to the second electrode of the other cell (to be termed the first cell), and optionally to return to the second cell. Optionally, first and second apertures are provided through the first current collector and the layer of dielectric material disposed on the second side of the first current collector to allow fluid to flow though the dielectric material and the current collector via the first aperture to the first electrode, along or through the electrode, and then out through the current collector and dielectric material through the first electrode, and/or first and second apertures are provided through the second current collector and the layer of dielectric material disposed on the second side of the second current collector to allow fluid to flow though the dielectric material and the current collector via the first aperture to the first electrode, along or through the electrode, and then out through the current collector and dielectric material through the second electrode, and the channel for transporting the first fluid from one cell (the first cell) to the first electrode of another cell (the second cell) is fluidly connected to the first and second apertures of the first cell.

Embodiments of the redox flow battery and components thereof will now be discussed with reference to the non-limiting Figures.

Figure 1A:
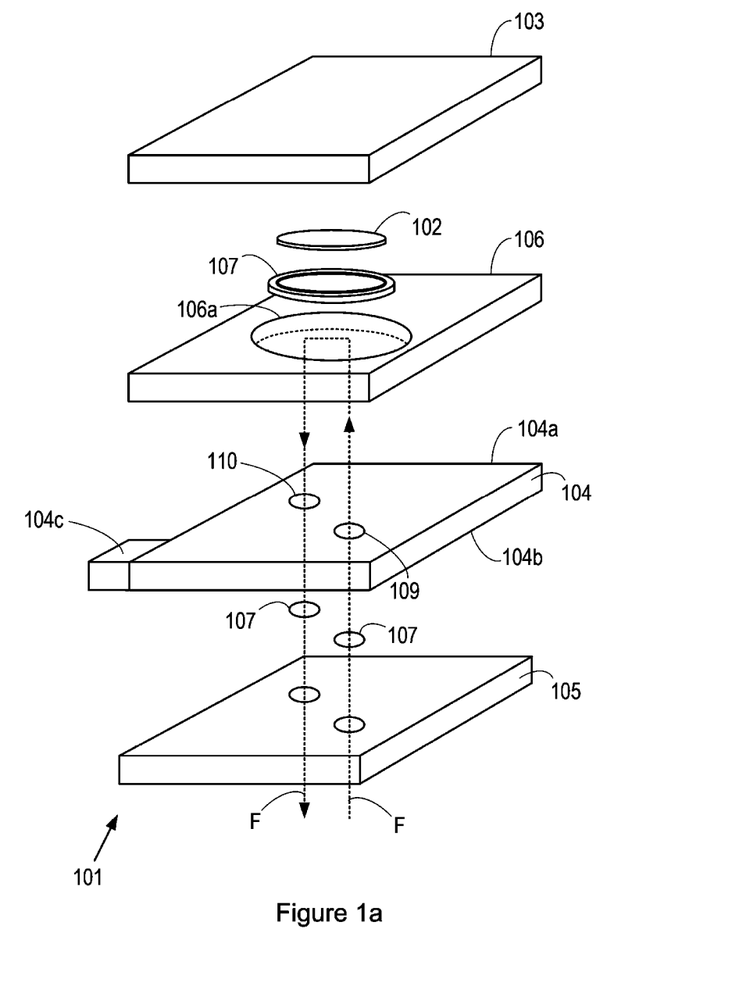
FIG. 1A illustrates schematically an exploded view of a component 101 of a redox flow battery.

FIG. 1A illustrates schematically an exploded view of a component 101 of a redox flow battery. In this Figure is shown a first electrode 102, a membrane (which may be selected from an ion-selective membrane and a molecular sieve membrane) 103, a first current collector 104 comprising a layer of electrically conductive material having opposing first (104A) and second (104B) sides, wherein the first electrode 102 is disposed on the first side 104A of the first current collector 104, and a first layer of dielectric material 105 is disposed on the second side of the first current collector 1046. A spacer 106 in the form of a dielectric material is disposed between the membrane (which may be selected from an ion-selective membrane and a molecular sieve membrane) 103 and the current collector 104. The dielectric material of the spacer 106 surrounds the electrode—in the Figure, it can be seen that an aperture 106A is present in the spacer 106 and accommodates the electrode 102. A protective annular member 107 in the form of an 'O'-ring is present, which, in use, extends around the edge of the dielectric material closest to the electrode (i.e. the edge defining the aperture that accepts the electrode), to prevent, in use, contact of the first fluid electrolyte with the dielectric material.

First (109) and second (110) apertures are provided through the current collector 104 and the layer of dielectric material 105 to allow fluid to flow though the dielectric material and the current collector via the first aperture to the electrode, along or through the electrode, and then out through the current collector and dielectric material through the second electrode. Protective annular members 107 in the form of 'O'-rings are present, and, in use, each extends around the edge of the dielectric material that define the aperture 109 or 110 in the dielectric material, to prevent contact of the first fluid electrolyte with the dielectric material. The fluid flow (denoted F in the figure) is shown schematically with a dotted arrow.

In this embodiment, the electrode 102 is a 3D porous electrode, formed from carbon fibres. The first fluid flows through the electrode to allow conversion of the analyte or catholyte between different oxidation states. In other embodiments, the electrode may be a flow-past, e.g. planar, electrode. The spacer 106 and the dielectric material 105 on the second side of the current collector 104 are both PCB materials, e.g. FR4. The current collector 104 is a layer of titanium, e.g. titanium foil, which may have a layer of TiN on the side of the titanium layer that faces the electrode 102. The spacer 106, current collector 104 and layer of dielectric material 105 may, in use, be adhered together, e.g. using a prepreg (e.g. an Arlon A47N) or an epoxy resin.

Figure 1B:
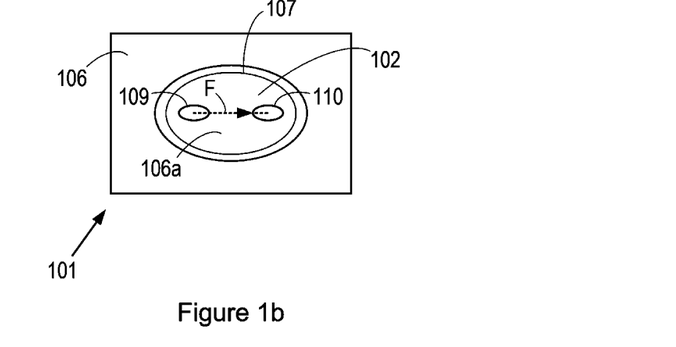
FIG. 1B illustrates the fluid flow through the first electrode of FIG. 1A from a view above the membrane-facing side of the electrode.

FIG. 1B illustrates the fluid flow through the first electrode 102 from a view above the membrane-facing side of the electrode. As can be seen, the spacer 106 surrounds the electrode 102, with the O-ring 107 being disposed around the edge of the aperture 106A in the spacer. The current collector 104 is disposed below the spacer 106 and the electrode 102. It can be seen that fluid exits the first aperture 109 in the current collector 104 and flows through the electrode 102 to the second aperture 110, through which it flows away from the electrode 102 through the current collector and the dielectric layer 105 below.

Figure 1C:
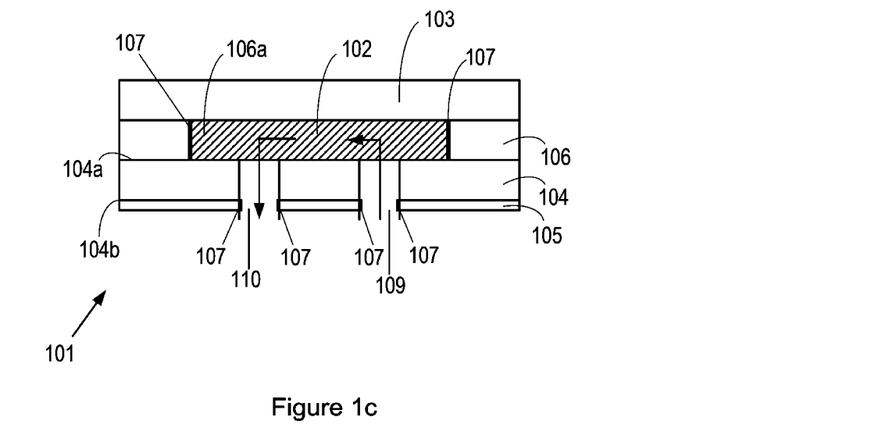
FIG. 1C shows schematically a cross-sectional view of the component of FIG. 1A, when taken through a cross-section parallel to the flow of fluid F in FIG. 1A.

FIG. 1C shows schematically a cross-sectional view of the component of FIG. 1A.

Figure 2A:
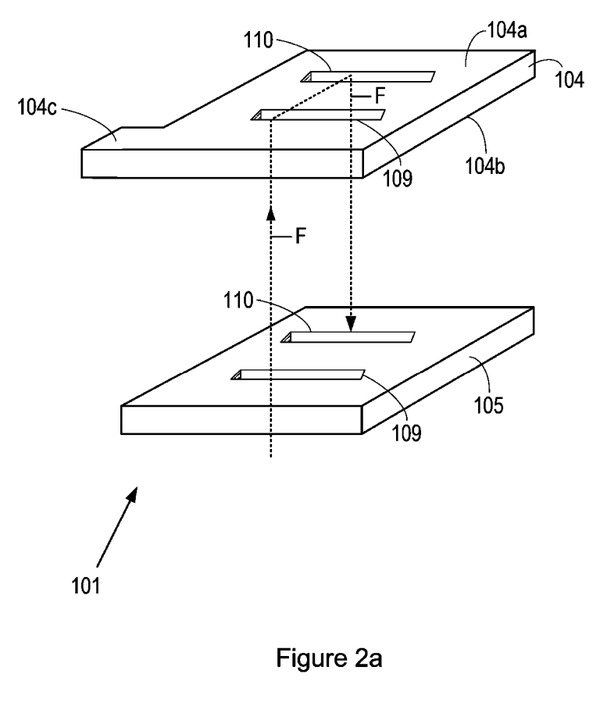
FIG. 2A shows an exploded view of a further embodiment of the current collector 104 and the layer of dielectric material 105.

FIG. 2A shows an exploded view of a further embodiment of the current collector 104 and the layer of dielectric material 105. The other components (the spacer 106, the electrode 102, the O-ring 107 and the membrane 103) are not shown for clarity, but would be present in the same arrangement as shown in FIG. 1. In the embodiment in FIG. 2A, the first (109) and second (110) holes in the current collector 104 and the layer of dielectric material 105, instead of being circular, are elongate (rectangular when viewed from above the layers), such that they extend across a greater proportion of the overlying electrode (not shown in FIG. 2A). The fluid flow through the apertures 109 in the current collector 104 and the layer of dielectric material 105, through the electrode (not shown) and then back through the apertures 110 is illustrated with a dotted arrow and denoted F in FIG. 2A.

Figure 2B:
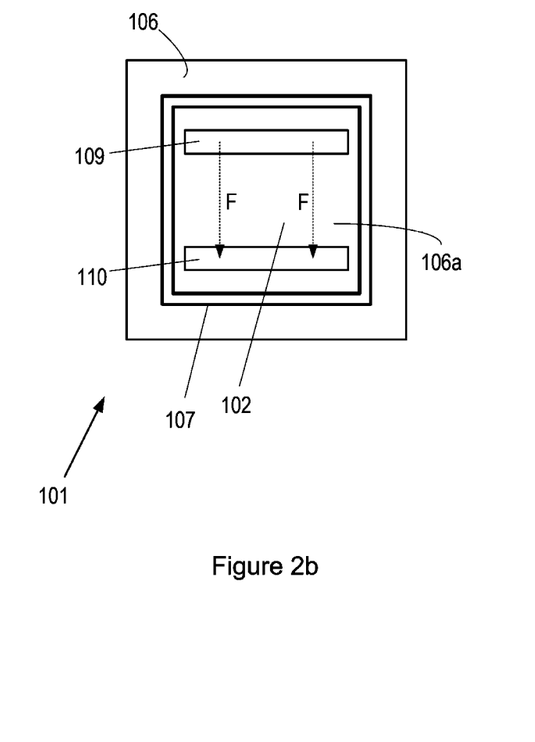
FIG. 2B illustrates, from above the side of the current collector 104, the flow of fluid F through the apertures 109 and 110 of the embodiment of FIG. 2A.

FIG. 2B illustrates, from above the side of the current collector 104, the flow of fluid F through the apertures 109 and 110 of the embodiment of FIG. 2A. The spacer 106 is shown in this figure, it having a rectangular aperture 106A for accommodating the electrode 102, which is also rectangular. A rectangular protective annular member 107 is present, which, in use, extends around the edge of the dielectric material closest to the electrode, to prevent, in use, contact of the first fluid electrolyte with the dielectric material.

FIG. 1C could represent a cross-sectional view of the embodiment of FIGS. 2A and 2B, in use, when taken through a cross-section parallel to the flow of fluid F in FIGS. 2A and 2B.

Figure 1D:
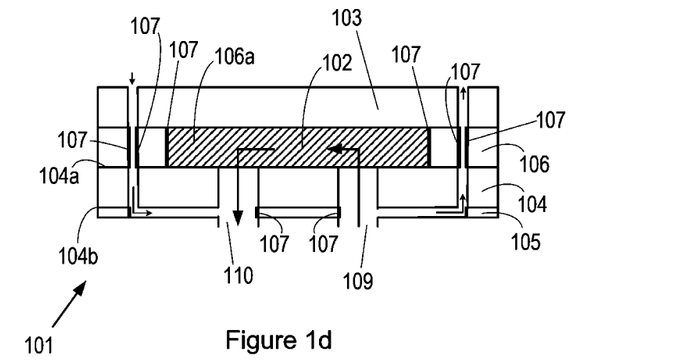
FIG. 1D shows schematically a cross-sectional view of a variant of the component of FIG. 1A, when taken through a cross-section parallel to the flow of fluid F in FIG. 1A. In this Figure, further channels have been formed either side of the electrode to transport fluid to/from an adjacent cell in a stack.

FIG. 1D shows schematically a cross-sectional view of a variant of the component of FIG. 1A, when taken through a cross-section parallel to the flow of fluid F in FIG. 1A. In this Figure, further channels have been formed either side of the electrode to transport fluid to/from an adjacent cell in a stack. The channels have been formed by apertures in the dielectric layer 105, the current collector 105, the spacer 106, the membrane 103 and through the other half of the cell (not shown, but which may be a mirror image of the half of the cell shown), so that the first fluid can be delivered from the first reservoir to the first electrode of a neighbouring cell (not shown), and then returned to the first reservoir.

Figure 3:
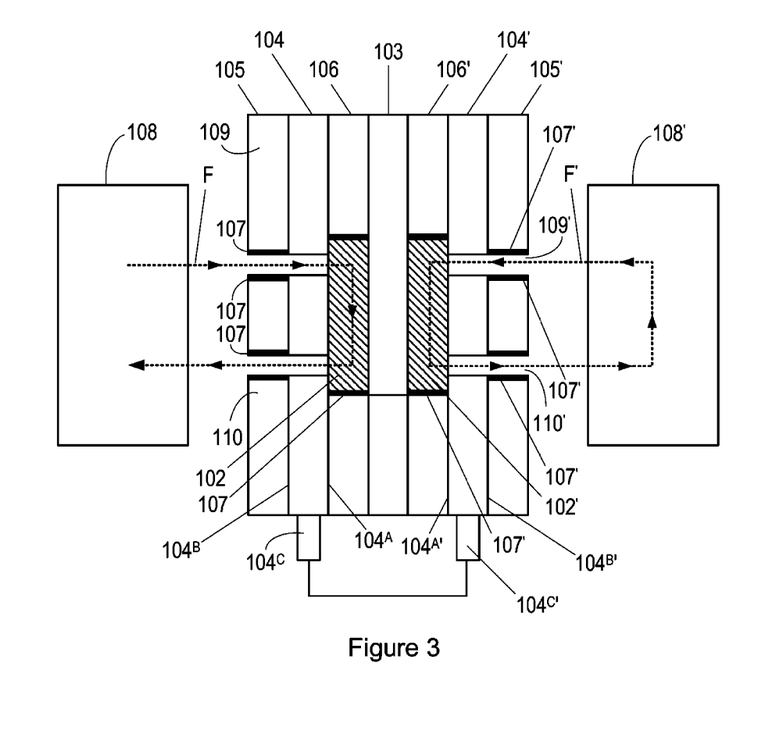
FIG. 3 illustrates schematically a cross-sectional view of rechargeable flow battery having the first (102) and second (102') electrodes separated by a membrane (which may be an ion selective membrane or a molecular sieve membrane) 103.

FIG. 3 illustrates schematically a cross-sectional view of rechargeable flow battery having the first (102) and second (102') electrodes separated by a membrane (which may be selected from an ion-selective membrane and a molecular sieve membrane) 103. In this embodiment, the components on the same side of the membrane 103 as the first electrode are as shown in FIG. 1A or 2A. In this embodiment, the second electrode is the same material as the first electrode, i.e. a 3D electrode comprising carbon fibres. The components on the same side of the membrane as the second electrode are the same as those on the same side of the membrane as the electrode, and, in FIG. 1 are numbered in the same way, except with an apostrophe (') following each number. In this Figure is shown a first reservoir 108 for holding a first fluid electrolyte and a second reservoir 108' for holding a second fluid electrolyte. The first reservoir 108 is fluidly connected to apertures 109 and 110 to allow fluid to flow from the first reservoir 108 to (and through) the first apertures 109 in the first current collector 104 and the layer of dielectric material 105, and then back to the reservoir 108 via apertures 110. Similarly, the second reservoir 108' is fluidly connected to apertures 109' and 110' to allow fluid to flow from the second reservoir 108' to (and through) the first apertures 109' in the first current collector 104' and the layer of dielectric material 105', and then back to the reservoir 108' via apertures 110'. In use, the first fluid would be one of the analyte and the catholyte, while the second fluid would be the other of the analyte and catholyte.

In an embodiment, the redox flow battery may comprise a plurality of cells having the layers shown in FIG. 3, with the cells being arrange in series, such that the first electrode of one cell would be electrically connected to the second electrode of the neighbouring cell. The components of each cell (i.e. the membrane, and, on both sides of the membrane: the spacer layers (which accommodate the electrodes), current collectors and layers of dielectric material would be adhered together. However, the cells themselves, unlike in a conventional stack of cells in a redox flow battery may be separable without having to dismantle the entire stack (which is typically the case in conventional redox flow batteries when all the cells are compressed together with endplates and bolts). Alternatively, the cells may be bonded together, either by adhesive or by mechanical means, such as with bolts. The cells may have extending therethrough apertures to allow fluid flow from one cell to another, which may be termed manifolding through the cells. The cells may be electrically connected, but the electrical connections may be removable, such that, once the electrical connections are disconnected from a particular cell, this cell could be removed from the stack easily, and inspected, fixed if any defects have developed and/or replaced. The electrical connections of the cells either side of the removed cell could be connected to one another to allow the battery as a whole to continue functioning while one of the cells has been removed. In an embodiment, one or more channels are present through the layers of each cell, but not through the electrodes (as for example illustrated in FIG. 1D), to allow the first fluid to flow through one cell (to be termed the first cell) to the first electrode of the other cell (to be termed the second cell), and optionally to return to the first cell, and/or to allow the second fluid to flow through one cell (to be termed the second cell) to the second electrode of the other cell (to be termed the first cell), and optionally to return to the second cell. Optionally, in each cell, first and second apertures are provided through the first current collector and the layer of dielectric material disposed on the second side of the first current collector to allow fluid to flow though the dielectric material and the current collector via the first aperture to the first electrode, along or through the electrode, and then out through the current collector and dielectric material through the first electrode, and the one or more channels for transporting the first fluid from one cell (the first cell) to the first electrode of another cell (the second cell) (and optionally to return to the first cell) are fluidly connected to the first and second apertures of the first cell.

EXAMPLES

Example 1

A redox flow battery containing a single cell was constructed, with the arrangement of components on both sides of the membrane being as shown in FIG. 1A and FIG. 3. The membrane was a Nafion 117 membrane. The dielectric layer 105 was a printed circuit board material, namely FR-4, which was bonded using an epoxy pre-preg (Arlon A47N) to a 0.75 mm thick titanium foil, which acted as the current collector 104. The spacer layer 106 on both sides of the membrane was also FR4, each of which had a circular aperture 106A for accommodating a rubber O-ring comprising material with the trade name Viton (available from Simply Bearings), and, within the O-ring, the electrode, which was a 3D carbon electrode, in particular a 36% compressed SGL carbon felt electrode. Each titanium foil 104 and connected dielectric layer 105 had circular through-holes that act as apertures 109 and 110 shown in FIG. 1B. O-rings were in place around the edge of the apertures in the dielectric layer to prevent contact of the anolyte/catholyte with the dielectric layer. The spacer layers 106 were both bonded to the membrane 103 and the titanium foils 104 by an epoxy pre-preg (Arlon A47N). The layers were 49 cm$^2$ in area. The titanium foils had a surface area of 49 cm$^2$. The active electrode area in this embodiment is 6.5 cm$^2$.

An all-vanadium couple was used in the redox flow battery. In particular, 1.6M of V$^{x+}$ species (x=2, 3, 4, 5) was used in 3M H$_2$SO$_4$. In the first fluid V$^{2+}$ (V(II)) and V$^{3+}$ were present. In the second fluid, VO$^{2+}$ (V(IV)) and VO$_2^+$ (V(V)) were present.

Example 2

Comparison Between the RFB of Example 1 and Reference RFB

In this Example, the performance of the redox flow battery of Example 1 was compared with that of a traditional endplate-compressed fuel cell, available from Scribner as part of their trade name Scribner 857 Redox Flow Cell Test System. The Scribner Redox Flow Cell comprises of a graphite plate (obtained from POCO Graphite) into which a flow-field may be machined. The carbon felt electrodes sit on this plate and is usually held in place by a PTFE spacer. The thickness of this spacer also will define the amount of compression of the felt electrode. The current passes through the graphite plate and into a gold coated copper current collector. The whole assembly is held together with two anodized aluminium end plates and 8 bolts. Both used the same all-vanadium couple described above. The Scribner RFB used 50% compressed Alfa Aesar carbon felt electrode and a Nafion 117 membrane. The layers of the Scribner were 25 cm$^2$ in area. In the Scribner RFB, the flow of electrolyte through the electrode was with a serpentine flow field configuration, i.e. via a serpentine channel in the current collector adjacent the electrode.

Figure 4:
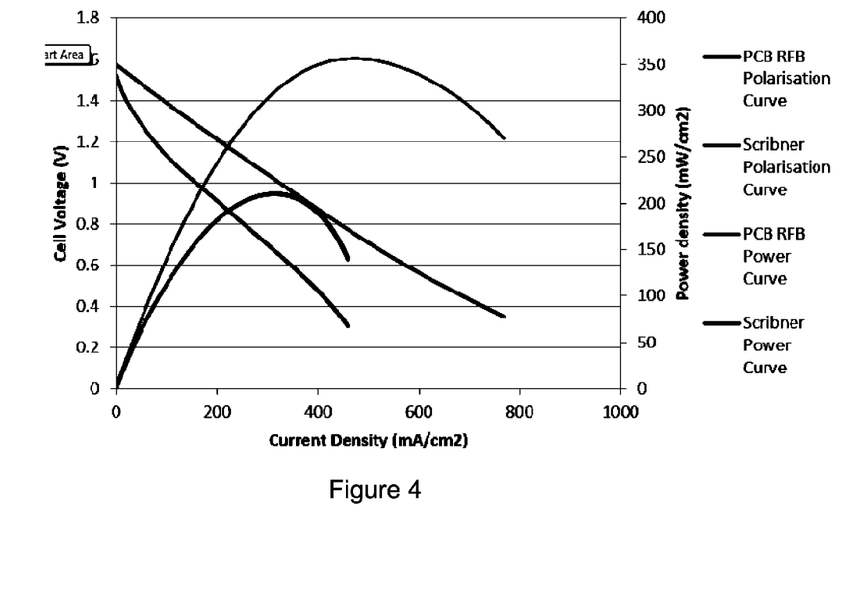
FIG. 4 shows polarisation and power curves for the RFB of Example 1 and the reference Scribner RFB.

FIG. 4 shows polarisation and power curves for the RFB of Example 1 and the reference Scribner RFB. These data are the raw data generated from an Ivium NStat potentiostat. The currents passed have been normalised to current density in order for easy comparison between the two systems The PCB RFB of Example 1 performed better that the traditional RFB system, as seen by the polarisation and power curves shown in FIG. 4. The area specific resistance of the PCB RFB of Example 1 is lower than the traditional Scribner RFB which accounts for a lower ohmic loss in the polarisation curve. To add, the flow of the PCB RFB of Example 1 was directly forced into the felt, as illustrated schematically in FIG. 1C, whereas, as mentioned, the traditional Scribner RFB operated with a serpentine flow field configuration. It is believed that the flow of the electrolyte in the PCB RFB of Example 1 ensured that there was no observable mass-transport loss on the polarisation curve. On the other hand, the traditional RFB system appears to be operating with mass transport losses at current densities>300 mA cm-2.

Figure 5:
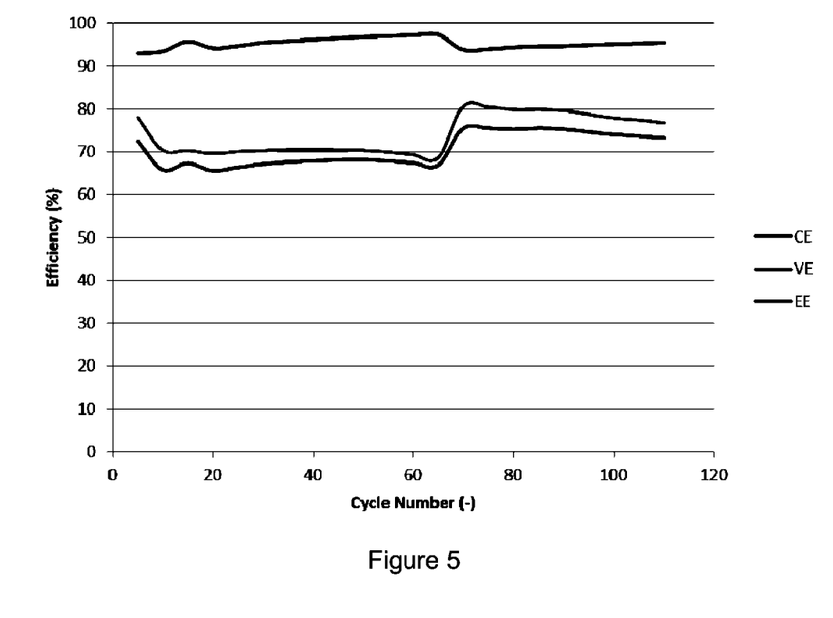
FIG. 5 shows various efficiencies (coulombic efficiency, CE; voltage efficiency, VE; energy efficiency, EE) of the PCB RFB of Example 1.
Figure 6:
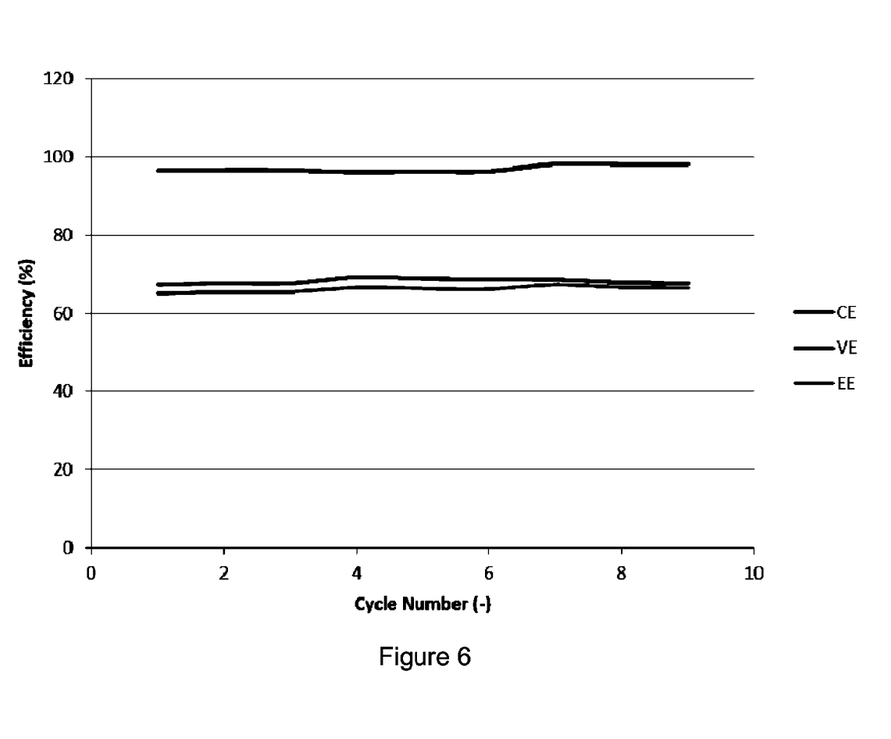
FIG. 6 shows various efficiencies (coulombic efficiency, CE; voltage efficiency, VE; energy efficiency, EE) of a traditional, reference RFB (described in more detail in the Examples below).

Various efficiencies (coulombic efficiency, CE; voltage efficiency, VE; energy efficiency, EE) of the PCB RFB of Example 1 are displayed in FIG. 5 and for the reference RFB in FIG. 6. Comparison of the two graphs shows that the EE and VE of the PCB RFB of Example 1 are higher than that of the traditional, reference RFB, although the CE is lower.

The invention claimed is:
1. A component for a rechargeable flow battery, wherein the component comprises:
   a first current collector comprising a layer of electrically conductive material having opposing first and second sides, wherein a first electrode is disposed on the first side of the first current collector, such that electrons can flow from the first electrode to the first current collector, and a first layer of dielectric material is disposed on the second side of the first current collector;
   wherein first and second apertures are provided through the first current collector and the first layer of dielectric material disposed on the second side of the first current collector to allow a first fluid to flow from the first aperture directly to, along, into, or past the first elec- trode and then out through the first current collector and dielectric material through the second aperture.

2. The component for a rechargeable flow battery according to claim 1, wherein the dielectric material disposed on the second side of the first current collector is a printed circuit board material comprising a layer of fibre-reinforced polymer.

3. The component for a rechargeable flow battery according to claim 1, wherein the dielectric material disposed on the second side of the first current collector is selected from FR-1, FR-2, FR-3, FR-4, FR-5, FR-6, CEM-1, CEM-2, CEM-3, CEM-4, CEM-5, polytetrafluoroethylene, G-10, G-11, alumina, polyimide, and woven fibreglass/PTFE laminates.

4. The component for a rechargeable flow battery according to claim 1, wherein the electrically conductive material is selected from titanium, titanium nitride, molybdenum, brass and carbon, which may be or comprise graphitic carbon.

5. The component for a rechargeable flow battery according to claim 1, wherein a protective annular member extends around the edge of the dielectric material defining the first and/or second aperture, to prevent contact of the first fluid with the dielectric material and any bonding agent materials contained therein.

6. The component for a rechargeable flow battery according to claim 5, wherein the protective annular member is selected from an O-ring, X-ring and a D-ring.

7. The component for a rechargeable flow battery according to claim 1, wherein a further layer of dielectric material is disposed on the first layer of dielectric material disposed on the second side of the first current collector, the further layer having channels and/or apertures formed therein for flow of the first fluid therethrough.

8. The component for a rechargeable flow battery according to claim 1, wherein the flow battery comprises an all-vanadium couple, a hydrogen-vanadium couple, a hydrogen-lithium bromate couple, a hydrogen-lithium chlorate couple, a hydrogen-polyoxometalate couple, a bromine-hydrogen couple, an iron-tin couple, an iron-chrome couple, a bromine-polysulfide couple, a zinc bromine couple, a lead-acid (methane sulfonate) couple, a zinc-cerium couple, or a lead acid couple, or the flow battery is a lithium ion flow battery, an ionic-liquid flow battery, or a molten salt flow battery.

9. A rechargeable flow battery comprising the component for a rechargeable flow battery of claim 1, wherein the battery also comprises a second electrode, and the first and second electrodes are separated such that ions are allowed to flow between them, wherein a first reservoir comprising or for holding the first fluid is fluidly connected to the first electrode, to allow circulation of the first fluid from the first reservoir to the first electrode and from the first electrode to the first reservoir.

10. The rechargeable flow battery of claim 9, wherein the first and second electrodes are separated by a membrane, which may be selected from an ion selective membrane or a molecular sieve membrane, and a dielectric material is disposed between the membrane and the first current collector, wherein the dielectric material disposed between the membrane and the first current collector surrounds the first electrode.

11. The rechargeable flow battery of claim 10, wherein the dielectric material disposed between the membrane and the first current collector is selected from FR-1, FR-2, FR-3, FR-4, FR-5, FR-6, CEM-1, CEM-2, CEM-3, CEM-4, CEM-5, polytetrafluoroethylene, G-10, G-11, alumina, polyimide, and woven fibreglass/PTFE laminates.

12. The rechargeable flow battery of claim 10, wherein a protective annular member extends around an edge of the dielectric material disposed between the membrane and the first current collector, to prevent contact of the first fluid with the dielectric material.

13. The rechargeable flow battery according to claim 9, wherein the flow battery comprises a stack, and wherein the stack comprises a plurality of cells, each cell comprising the first and second electrodes, wherein the first current collector of a cell in the stack is electrically connected to a second current collector of a neighbouring cell in the stack.

14. The rechargeable flow battery according to claim 13, wherein each cell comprises a plurality of layers, and wherein one or more channels are present through the layers of each cell, but not through the first and second electrodes, to allow the first fluid to flow through a first cell to the first electrode of a second cell, and optionally to return to the first cell, and/or to allow a second fluid to flow through the second cell to the second electrode of the first cell, and optionally to return to the second cell.

15. The rechargeable flow battery according to claim 14, wherein the channel(s) to allow the first fluid to flow from the first cell to the first electrode of the second cell is fluidly connected to the first and second apertures of the first cell.

16. The rechargeable flow battery according to claim 13, wherein the first current collector of a cell in the stack is electrically connected to the second current collector of a neighbouring cell in the stack via removable electrical connections to allow removal of one cell from the stack, and re-connection of the remaining cells in the stack to allow the cells to continue functioning with a removed cell.

17. The rechargeable flow battery according to claim 13, wherein the cells are bonded together.

* * * * *

UNITED STATES PATENT AND TRADEMARK OFFICE
CERTIFICATE OF CORRECTION

| | | |
|---|---|---|
| PATENT NO. | : 11,387,479 B2 | Page 1 of 1 |
| APPLICATION NO. | : 15/733406 | |
| DATED | : July 12, 2022 | |
| INVENTOR(S) | : Brett et al. | |

It is certified that error appears in the above-identified patent and that said Letters Patent is hereby corrected as shown below:

On the Title Page

(71) Applicants: Please correct "IMPERIAL INNOVATIONS LIMITED, London (GB)" to read --IMPERIAL COLLEGE INNOVATIONS LIMITED, London (GB)--

In the Specification

Column 12, Line 65: Please correct "1046." to read --104B.--

Signed and Sealed this
Sixteenth Day of July, 2024

Katherine Kelly Vidal
*Director of the United States Patent and Trademark Office*